(12) United States Patent
Tschiskale et al.

(10) Patent No.: US 12,332,726 B2
(45) Date of Patent: Jun. 17, 2025

(54) CONTROL UNIT FOR A DRIVER ASSISTANCE SYSTEM, AND DRIVER ASSISTANCE SYSTEM

(71) Applicant: ZF FRIEDRICHSHAFEN AG, Friedrichshafen (DE)

(72) Inventors: Ega Tschiskale, Stockach (DE); Thorsten Sonntag, Radolfzell (DE); Michael Ewert, Radolfzell (DE); Michael Krespach, Daisendorf (DE); Benjamin Schullcke, Gottmadingen (DE); Armin Kempter, Sauldorf (DE); Michael Stuetz, Radolfzell (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 396 days.

(21) Appl. No.: 17/786,815

(22) PCT Filed: Dec. 14, 2020

(86) PCT No.: PCT/EP2020/085992
§ 371 (c)(1),
(2) Date: Jul. 26, 2022

(87) PCT Pub. No.: WO2021/122460
PCT Pub. Date: Jun. 24, 2021

(65) Prior Publication Data
US 2023/0028289 A1    Jan. 26, 2023

(30) Foreign Application Priority Data

Dec. 20, 2019    (DE) ...................... 10 2019 220 382.5
Dec. 20, 2019    (DE) ...................... 10 2019 220 388.4

(51) Int. Cl.
*G06F 11/00*    (2006.01)
*B60S 1/48*    (2006.01)
(Continued)

(52) U.S. Cl.
CPC .......... *G06F 11/0739* (2013.01); *B60S 1/481* (2013.01); *B60W 50/0205* (2013.01);
(Continued)

(58) Field of Classification Search
CPC ............. G06F 11/0739; G06F 11/0721; G06F 11/1629; G06F 11/1654; G06F 11/3013;
(Continued)

(56) References Cited

U.S. PATENT DOCUMENTS 9,940,761 B2 *    4/2018    Kundu ................. G05D 1/0055
2007/0277023 A1 *    11/2007    Weiberle ............. G06F 11/1641
712/E9.035
(Continued)

FOREIGN PATENT DOCUMENTS

DE    102018104357 A1    8/2019
EP    1588928 A2    10/2005
(Continued)

OTHER PUBLICATIONS

Kumar, R. S., Stanley, P. K., & Gandhi, A. S. (2017). Raspberry Pi based vehicle collision avoidance system. 2017 International Conference on Innovations in Electrical, Electronics, Instrumentation and Media Technology (ICEEIMT). doi:10.1109/icieeimt.2017.8116838.
(Continued)

*Primary Examiner* — Joseph D Manoskey
(74) *Attorney, Agent, or Firm* — ROSSI, KIMMS & McDOWELL LLP

(57) ABSTRACT

The invention relates to a control device for a driver assistance system, wherein the control device comprises a sensor interface via which the control device can be connected to at least one sensor module to receive data from the at least one sensor module, a power processor which is adapted to detect objects and to provide object data based on the data from the
(Continued)

at least one sensor module, and a system interface via which the control device can be connected to a higher-level control device of the driver assistance system for forwarding object data provided by the power processor.

15 Claims, 9 Drawing Sheets

(51) Int. Cl.
```
B60W 50/02      (2012.01)
B60W 50/04      (2006.01)
B60W 50/06      (2006.01)
B60W 60/00      (2020.01)
G06F 11/07      (2006.01)
G06F 11/16      (2006.01)
G06V 10/147     (2022.01)
G06V 20/56      (2022.01)
G06F 1/20       (2006.01)
```

(52) U.S. Cl.
CPC .......... *B60W 50/045* (2013.01); *B60W 50/06* (2013.01); *B60W 60/0015* (2020.02); *G06F 11/1629* (2013.01); *G06V 10/147* (2022.01); *G06V 20/56* (2022.01); *B60W 2050/0215* (2013.01); *B60W 2420/408* (2024.01); *G06F 1/20* (2013.01)

(58) Field of Classification Search
CPC ........ G06F 1/20; G06V 20/56; G06V 10/147; B60W 60/0015; B60W 50/0205; B60W 50/045; B60W 50/06; B60W 2420/408; B60W 2050/0215; B60S 1/481
See application file for complete search history.

(56) References Cited

U.S. PATENT DOCUMENTS

| | | |
|---|---|---|
| 2011/0010041 A1* | 1/2011 | Wagner ............... G01S 13/87 701/1 |
| 2018/0043633 A1 | 2/2018 | Zhu et al. |
| 2018/0143633 A1* | 5/2018 | Paryani ............. G06F 11/1629 |
| 2020/0164297 A1* | 5/2020 | Liao .................... B01D 46/0005 |
| 2020/0201323 A1* | 6/2020 | Park ..................... B60W 50/04 |
| 2021/0163021 A1* | 6/2021 | Frazzoli ................ H04W 4/48 |
| 2023/0061577 A1* | 3/2023 | Bueb .............. B60W 60/00186 |
| 2023/0192138 A1* | 6/2023 | Lee ...................... B60W 50/02 701/23 |

FOREIGN PATENT DOCUMENTS

| | | |
|---|---|---|
| EP | 3032457 A1 | 6/2016 |
| WO | 2013/043661 A1 | 3/2013 |

OTHER PUBLICATIONS

Linear Technology. "LTC2970 datasheet—Dual I2C Supply Monitor and Margin Controller", 2006, pp. 1-38. https://www.analog.com/MEDIA/EN/TECHNICAL-DOCUMENTATION/DATA-SHEETS/29701FE.PDF, retrieved on Jun. 13, 2022.

International Search Report issued in International Appln. No. PCT/EP2020/085992 mailed Jun. 9, 2021. English translation provided.

Written Opinion issued in International Appln. No. PCT/EP2020/085992 mailed Jun. 9, 2021. English translation provided.

* cited by examiner

CONTROL UNIT FOR A DRIVER ASSISTANCE SYSTEM, AND DRIVER ASSISTANCE SYSTEM

RELATED APPLICATIONS

This application is a U.S. National Stage Application filed under 35 USC 371, claiming priority to Serial No. PCT/EP2020/085992, filed on 14 Dec. 2020; which claims priority from German Patent Application DE 10 2019 220 388.4, filed 20 Dec. 2019 and German Patent Application DE 10 2019 220 382.5, filed 20 Dec. 2019, the entireties of which are hereby incorporated herein by reference.

TECHNICAL FIELD

The invention relates to a control device, in particular a LIDAR control device for processing sensor data from a LIDAR sensor for a driver assistance system in a motor vehicle, such as a passenger car or truck. The invention also relates to such a driver assistance system with a LIDAR sensor for motor vehicles.

BACKGROUND

US 2018/043633 A1 discloses a multiprocessor system for automated driving systems. This known multiprocessor system is to reliably process large amounts of data from multiple sensors for automated driving systems. For this purpose, a safety processor is provided on the known multiprocessor system, which processor checks control commands for automated driving, which commands are calculated by a first high-power processor. The high-power processor can be connected to a LIDAR processing module to receive and process pre-processed sensor data from a LIDAR sensor. While the separate LIDAR processing module creates sufficient capacity for processing large sensor data streams, verification of processing steps is limited to checking the control commands determined by the high-power processor with the safety processor.

Automated driving systems benefit from environment sensors that are as high-resolution as possible, which sensors map the environment in which the motor vehicle equipped with the automated driving system is located in a higher quality. High-resolution environment sensors must be connected to a driver assistance system or control device that processes the data from the environment sensor via communication links with a high bandwidth to ensure timely transmission and further processing of the data. High-bandwidth communication links are sensitive to electromagnetic interference over long transmission distances.

An increasing number of control devices and connecting lines leads to an increase in vehicle mass without savings elsewhere, which runs counter to the general efforts of the automotive industry to reduce fuel consumption and pollutant emissions.

SUMMARY

It is the object of the invention to overcome the disadvantages of the prior art and in particular to provide a control device and a driver assistance system which are improved in terms of reliability and the ratio of costs, system weight, and reliability.

This problem is solved by the subject matter of the independent claims.

According to this, a control device for a driver assistance system comprises a sensor interface via which the control device can be connected to at least one sensor module to receive data from the at least one sensor module, a power processor which is adapted to detect objects and to provide object data based on the data from the at least one sensor module, and a system interface via which the control device can be connected to a higher-level control device of the driver assistance system for forwarding object data provided by the power processor. According to the invention, the control device has a sensor voltage supply unit via which it provides the operating energy for the at least one sensor module. With the integration of a sensor voltage supply unit, the overall system costs and the system weight could be reduced, since a separate sensor module voltage supply and cabling can be eliminated. In particular, the sensor module voltage supply has power electronics comprising metal oxide semiconductor field effect transistors and/or gallium nitride transistors. The sensor module voltage supply is preferably adapted for a supply power of at least 10 watts per sensor module. In particular, the sensor module voltage supply is adapted in such a way that it provides a supply power reserve. One or more of the aforementioned measures have the advantage of a stable, reliable and cost-effective power supply for sensor modules for a driver assistance system.

In particular, the driver assistance system is configured to guide a motor vehicle in the longitudinal and/or transverse direction. The use of a LIDAR sensor module as the sensor module has proven to be advantageous in such driver assistance systems. A LIDAR sensor module can include one or more LIDAR sensors, such that the sensor interface is adapted to transmit large amounts of data of at least 100 megabits per second per sensor module. In particular, the power processor is equipped with one or more graphics processing units (GPU) to be able to further process the large amounts of data quickly. In particular, the system interface is adapted to transmit data with a bandwidth of at least 1 gigabit per second. Despite the high data transmission bandwidths of the interfaces, the power supply for the sensor modules is integrated in the control device. In particular, the power supply is arranged on a printed circuit board with the power processor.

According to another aspect of the invention, a control device for a driver assistance system comprises a sensor interface via which the control device can be connected to at least one sensor module to receive data from the at least one sensor module, a power processor which is adapted to detect objects and to provide object data based on the data from the at least one sensor module, a system interface via which the control device can be connected to a higher-level control device of the driver assistance system for forwarding object data provided by the power processor, and a safety processor which is connected to the power processor and adapted to check at least one processing step of the power processor for errors and/or to check a processing status of the power processor. According to the invention, the control device comprises another power processor which is connected to the power processor. The additional power processor enables redundant data processing, which increases the reliability of the system. There is also the option of using the entire computing capacity of both power processors. A power processor according to the invention includes a microprocessor as a separate electronic component that can be integrated into the control device and is equipped with one or more computing cores.

In particular, the power processor and the additional power processor are connected to one another via two independent data transmission channels. The load distribution options are improved by the independent data transmission channels.

In particular, the data transmission channels use different transmission protocols. One channel is preferably configured according to the PCI Express standard and another according to a network protocol such as Ethernet. In particular, one of the data transmission channels is formed by coupling multiple ports of network switches that are preferably integrated in the power processors.

Where the power processor is mentioned below, this means either the first or the second power processor or a computing network made up of the first and second power processor.

In particular, the control device has a sensor voltage supply unit via which it provides the operating energy for the at least one sensor module. With the integration of a sensor voltage supply unit, the overall system costs and the system weight could be reduced, since a separate sensor module voltage supply and cabling can be eliminated. In particular, the sensor module voltage supply has power electronics comprising metal oxide semiconductor field effect transistors and/or gallium nitride transistors. The sensor module voltage supply is preferably adapted for a supply power of at least 10 watts per sensor module. In particular, the sensor module voltage supply is adapted in such a way that it provides a supply power reserve. One or more of the aforementioned measures have the advantage of a stable, reliable and cost-effective power supply for sensor modules for a driver assistance system.

In particular, according to the first or second aspect of the invention, the control device comprises a safety processor which is connected to the sensor voltage supply unit and is adapted to monitor the sensor voltage supply unit. In particular, the safety processor is designed in such a way that at least one automotive safety integrity level B, C or preferably D is achieved by the safety processor. Checking the sensor voltage supply unit ensures that the voltage supply is working within a predetermined range of electromagnetic compatibility with regard to at least the sensor interface and/or the system interface.

In particular, the control device according to the first or second aspect of the invention has a safety processor which is connected to the power processor and is adapted to check at least one processing step of the power processor or one of the power processors for errors and/or to check a processing status of the power processor or one of the power processors. The use of a safety processor at the functional level of processing raw data from the sensor modules and during object detection improves the reliability of the control device and the transmitted object data. The safety processor is configured to calculate results, the processing sequence and/or status information of the power processor or one of the power processors and/or any component of the control device connected to the safety processor.

In particular, the control device according to the first or second aspect of the invention is configured and adapted such that the safety processor checks a processing step in the object detection of the power processor or one of the power processors for data from the sensor module and/or accesses object data via an interface to the power processor. In particular, the interface is configured according to the Serial Peripheral Interface Standard. Potential overloading of the safety processor by large amounts of data received from the sensor modules is avoided via the exclusive data access with the aid of the power processor or a first of the power processors, respectively. In particular, the safety processor is designed to verify processing times and selected processing steps of the power processor without reproducing the complete program sequences implemented on the power processor.

In particular, the sensor interface is configured to be connected to at least three sensor modules, in particular to four sensor modules, at the same time. The control device according to the first or second aspect of the invention is preferably also adapted to chronologically synchronize the data received via the sensor interface from the at least three sensor modules. With the help of the connection of three or more sensor modules, highly detailed determination of objects in the area surrounding a motor vehicle becomes possible. Due to the chronological synchronization of the received data by means of the sensor interface, immediate processing in the power processor is possible without further pre-processing, which frees up the computing capacity of the power processor for other tasks.

In particular, the power processor or the power processors are adapted and designed to determine an area passable by a motor vehicle based on the data from the at least one sensor module. The provision of data regarding the passable area is a safety-critical function in automated driving. The overall reliability of an automated driving system improves with the increase in reliability of the control device for determining the passable area through the use of the safety processor.

In particular, the control device according to the first or second aspect of the invention comprises a control system for a cooling system of the control device. In particular, the control device is actively cooled. In particular, the control device includes an air cooling system. In particular, the control device includes a liquid cooling system. The integration of a cooling system allows the additional electrical power supply required for the sensor voltage supply unit of the sensor modules to be integrated within the control device without impairing the processing performance of the control device or its service life.

In particular, according to the first or second aspect of the invention, the control device comprises power electronics for controlling a cleaning system for the at least one sensor module. The power electronics are adapted and designed to control a pump. In particular, the power electronics comprises a driver circuit for a brushless motor, such as a pump motor. The control device thus comprises all the components that are required to supply the sensor modules and keep them in operation. As a result, all of these components benefit from the safety processor provided in the control device and its function monitoring, such that overall highly secure and highly available object data provision is implemented.

In particular, the power processor according to the first or second aspect of the invention or at least one of the power processors is connected to the sensor interface for receiving data from the at least one sensor module and to the system interface and is configured to forward object data determined on the basis of the data from the at least one sensor module to the system interface. The sensor interface is preferably connected exclusively to the power processor or to precisely one of the power processors. Connected means the connection of two communication ports designed as hardware for data transmission. The complexity and costs of the control device are reduced with the elimination of a separate connection of the sensor interface to the safety processor. A check is made by accessing the power processor.

In particular, the control device according to the first or second aspect of the invention comprises a housing, wherein the housing is dustproof and/or waterproof. The housing is preferably designed at least according to protection class IP6K7. In particular, the housing has a ventilation membrane that is secured against the ingress of water.

The control device according to the first or second aspect of the invention is preferably a LIDAR control device. The at least one sensor module is preferably a LIDAR sensor module.

According to another aspect of the invention, a control device for a driver assistance system is provided that comprises a sensor interface via which the control device can be connected to at least one sensor module to receive data from the at least one sensor module, a power processor that is adapted for this purpose to detect objects and to provide detected objects based on the data from the at least one sensor module; and another power processor connected to the power processor for transmitting control commands and/or data of the at least one sensor module. The power processor and the additional power processor can be configured for a safe operating mode in such a way that the additional power processor is adapted to detect objects and provide detected objects based on the same data from the at least one sensor module, and the power processor and the additional power processor are configurable for a high-performance operating mode in such a way that the power processor and the additional power processor are each adapted to select part of the data of the sensor module based on the data from the at least one sensor module and to assign it to a respective one of the power processors and to detect objects and to provide detected objects based on the assigned data.

The modular operation of the control device with a safe and a high-performance operating mode allows the use of one and the same control device in different applications for driver assistance systems, i.e. both in scenarios that require particularly secure object provision and in scenarios in which objects with large data volumes are to be provided.

In particular, the power processor includes and/or the additional power processor is a hardware diagnostics module that is adapted to check one or more of the power supply, clock, processor reset, non-volatile memory such as flash memory, volatile memory such as static random access memory (SRAM), and connections between the aforementioned for their correct functioning.

In particular, the power processor includes and/or the additional power processor is a software diagnostics module, i.e. a diagnostics module programmed as software, which is adapted to run software which, when it is run, resets one or more of the energy supply, clock, processor, non-volatile memory, such as flash memory, volatile memory, such as static random access memory (SRAM), and data connections between the aforementioned uses to check that they are functioning correctly.

In particular, the hardware diagnostic modules of the power processors are connected to one another and adapted to exchange functional test results and to signal functional errors to the respective other power processor.

In particular, the control device is adapted and designed to select the other power processor in the event of a functional error in one of the power processors and to recognize objects based on at least some of the data from the at least one sensor module and to provide recognized objects.

A diagnostic module designed as hardware is therefore provided for the functioning of central hardware elements, as a result of which a high degree of reliability is ensured when diagnosing potential errors. Further diagnostics can be implemented using software modules without negatively affecting the overall diagnostic capability, since the correct functionality of the most important hardware components is monitored by the hardware diagnostics module. Overall, this provides a more flexible and cost-effective control device that can be used in safety-critical driver assistance applications.

The invention also relates to a driver assistance system for a motor vehicle, the driver assistance system comprising: a domain controller with a power processor and a safety processor, wherein the power processor is configured to process object data received via a vehicle network relating to an environment of the motor vehicle to provide a driver assistance function, and the safety processor is configured and adapted to check at least one processing step of the power processor for correctness, and a control device that can be connected to the domain controller, wherein the control device has a sensor interface via which the control device can be connected to at least one sensor module to receive data from the at least one sensor module, and comprises a power processor which is adapted to detect objects and to provide object data based on the data from the at least one sensor module, and wherein the control device comprises a safety processor for checking a processing status of the power processor and/or a processing step of the power processor for errors.

A driver assistance system with increased reliability is provided by providing a safety processor already at the level of processing the data from the sensor modules.

The driver assistance system preferably includes a control device according to the invention, as has been described above.

BRIEF DESCRIPTION OF THE DRAWINGS

Further features, advantages and properties of the invention are explained on the basis of the description of preferred embodiments of the invention with reference to the figures, wherein.

DESCRIPTION

Figure 1:
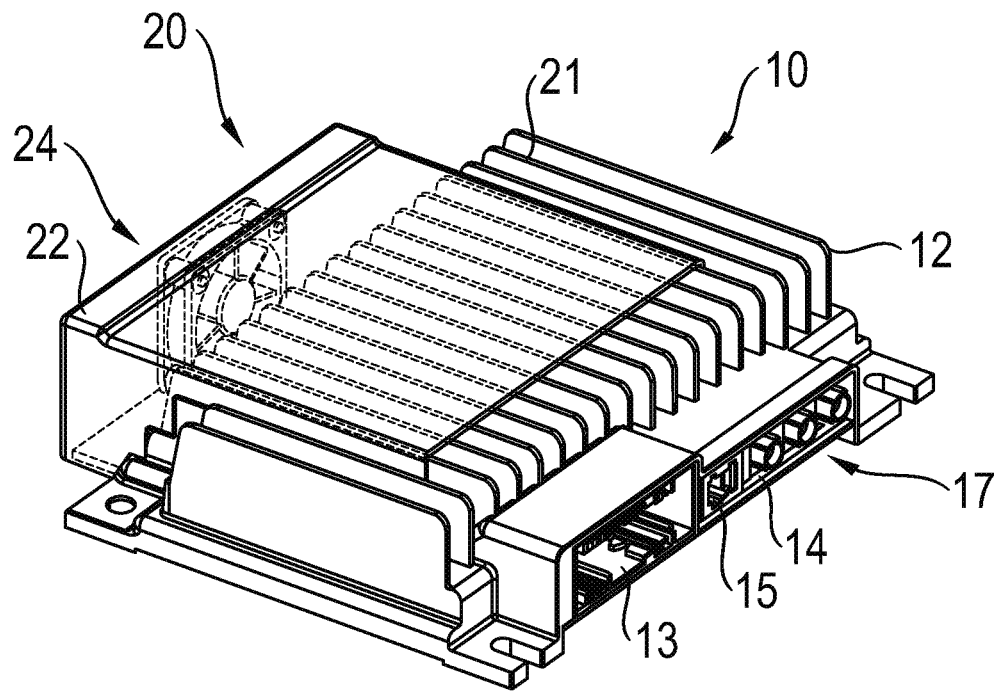
FIG. 1: shows a perspective view of a control device according to a first embodiment.

FIG. 1 shows a first embodiment of a control device 10 according to the invention for a driver assistance system not shown in detail in the figure, for example a system for automated driving according to VDA level 2 or higher, such as a freeway autopilot. The control device 10 comprises an electronic circuit that is arranged on one or more printed circuit boards. At least some of the electrical interfaces of the control device 10 are arranged on the printed circuit board 14, namely a connection socket 13, a network socket 15 according to the RJ-45 standard, and sensor module connections 17. The sensor module connections 17 use a coaxial plug-in system for coaxial cables. Further electrical interfaces are not shown, but can be provided by this exemplary embodiment, as can be seen from the further description.

The circuit board 14 is arranged in a housing 12. The housing 12 is made of a thermally conductive material, for example a metal such as aluminum or a metal alloy such as an aluminum alloy. The housing 12 has openings through which the electrical interfaces of the control device 10 are accessible to the outside of the housing.

The control device 10 also has a cooling system 20. The cooling system 20 comprises cooling fins 21 formed in the housing 12, which fins increase the surface area of the housing 12 which is available for heat exchange. The cooling system 20 also includes a cooling system carrier 22 which connects essential components of the cooling system 20 to one another. The cooling system carrier 22 defines the orientation and the distance between the fan 24 and the cooling fins 21. Furthermore, the cooling system carrier 22 forms a ventilation duct which extends along the cooling fins 21. The fan 24 is operated electrically and its speed can be controlled. Heat exchange capacity and noise generation are adapted optimally by suitable orientation and compliance with a minimum distance from the cooling fins to avoid turbulence on the cooling fins 21 as well as by the dimensioning of the ventilation duct. The cooling system 20 also includes one or more temperature sensors, not shown in detail, within the housing 12 of the control device 10, and a control module 28 which is shown in the example according to FIG. 2, for example. The control module 28 uses operating data from the control device 10 and the temperature sensors to determine a current and future cooling requirement and controls the fan 24 in such a way that the cooling requirement is covered with the least possible noise development.

The cooling system carrier 22 and the housing 12 of the control device 10 include a plug-in system that provides a mechanical and an electrical connection between the cooling system carrier 22 and the control device 10. This makes assembly easier.

In a variant of the cooling system 20 that is not shown, a pipeline extends in a meandering manner along the cooling fins 21 within the space delimited by the cooling system carrier 22. A cooling fluid is driven through the pipeline by means of an electrically operated pump to absorb heat and dissipate it to a heat exchanger. The heat exchanger may be remote from the control device 10, and the piping may extend to the heat exchanger. In this variant of the cooling system 21, the control system of the pump takes the place of the control system 28 of the fan 24 and/or of the heat exchanger.

Figure 2:
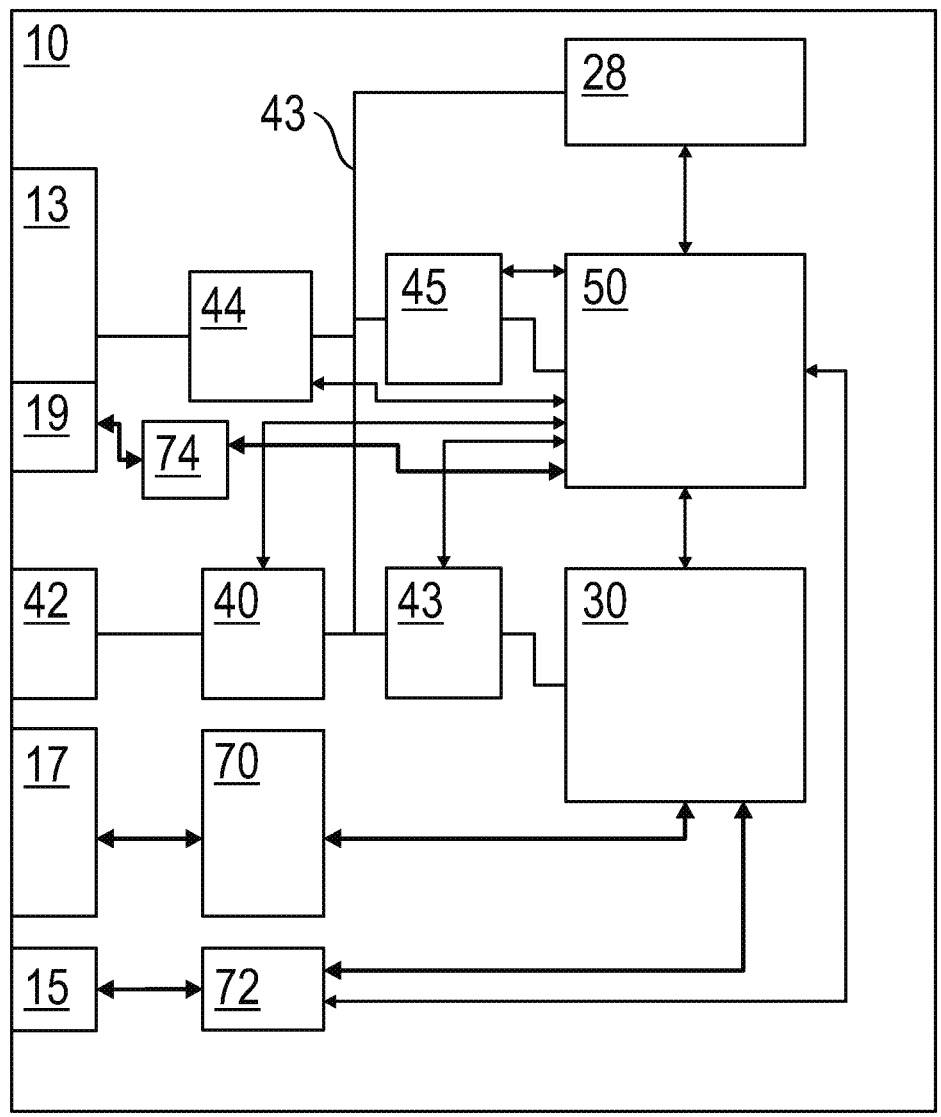
FIG. 2: shows a schematic view of the first control device according to the embodiment of FIG. 1.

FIG. 2 shows a schematic view of the functional components of the embodiment of the control device 10, the external view of which is shown in FIG. 1. The control device 10 is supplied with electrical energy via the connection socket 13. The energy supply module 44 takes over basic energy supply functions, such as reverse polarity protection, voltage and/or current stabilization, buffering, and distributes electrical energy received via the connection socket 13 within the control device 10 via the power supply network 41.

A sensor interface of the control device 10 is formed by sensor module connections 17 and a sensor communication module 70. The sensor communication module 70 is designed, for example, according to the Gigabit Multimedia Serial Link (GMSL) standard, and the sensor module connections are designed as a coaxial connector system. Alternatively, the sensor communication module 70 is designed according to the Ethernet standard and the sensor module connections are designed as an RJ-45 plug-in system. The sensor interface comprises a respective GMSL sensor module connection for each sensor module to be connected or an Ethernet connection for each sensor of a sensor module to be connected. In particular, a sensor module has two sensors each.

The control device 10 comprises three sensor module connections, two of which are connected to sensor modules of two sensors each and one of which is connected to a sensor module with one sensor.

The sensor communication module 70 forwards data received from the sensor modules to a power processor 30 that is connected to the sensor communication module 70. The power processor 30 is powered by a processor supply unit 43, which in turn is powered by the power grid 41. The power processor 30 is also connected to a system interface, which is implemented by a network module 72 and a network connection 15. The control device 10 can use the system interface to communicate data processed by the power processor 30 to the driver assistance system and receive data therefrom. The power processor prepares the data received from the sensor modules and processes them with object recognition algorithms to detect objects in the area surrounding the vehicle that is equipped with the control device 10.

The control device 10 comprises a sensor voltage supply unit 40 which is fed from the energy supply network 41. The sensor modules can be supplied with energy from control device 10 via a plug-in connection 42. The sensor voltage supply unit comprises separate power electronics for a respective sensor of the sensor modules for independent provision of a stable supply. The sensor voltage supply unit 40 is configured such that at least 20%, particularly at least 30%, preferably 60% of the energy requirement of a sensor or at least 15% of the total energy requirement of the sensor modules is available as standby energy.

The sensor voltage supply unit 40 is also connected to a safety processor 50. The safety processor 50 is adapted to enable an implementation of the ASIL D standard. For this purpose, the safety processor 50 has at least one lockstep arithmetic core. The safety processor 50 is also adapted to monitor the sensor voltage supply unit 40. Since an error or a failure of data from the sensor modules can have serious consequences for automated driving, monitoring the sensor voltage supply unit 40 contributes to increasing the reliability of control device 10 and the driver assistance system. With the help of the safety processor 50, input or output voltage curves, corresponding current curves, a temperature and/or other electrical operating parameters of the sensor voltage supply unit 40 are recorded and evaluated to detect functional limitations at an early stage.

The safety processor 50 also monitors the processor supply unit 43 of the power processor 30, a processor supply unit 45 of the safety processor 50 itself and the energy supply unit 44. The entire energy supply of the control device 10 is thus monitored using the respective operating parameters, such that potential problems can be identified immediately.

The safety processor 50 is also adapted and configured to check the processing steps that the power processor 30 carries out when processing data from the control device 10, in particular when detecting objects and forwarding object data. The safety processor 50 also handles checking and/or control tasks for the control system 28 of the cooling system and for the network module 72, via which the power processor 30 communicates with the driver assistance system.

Finally, the safety processor 50 is connected via a bus communication module 74 and a bus connection 19 to a communication bus, such as a CAN bus, of the motor vehicle, via which bus data can be exchanged within the vehicle.

Figure 3:
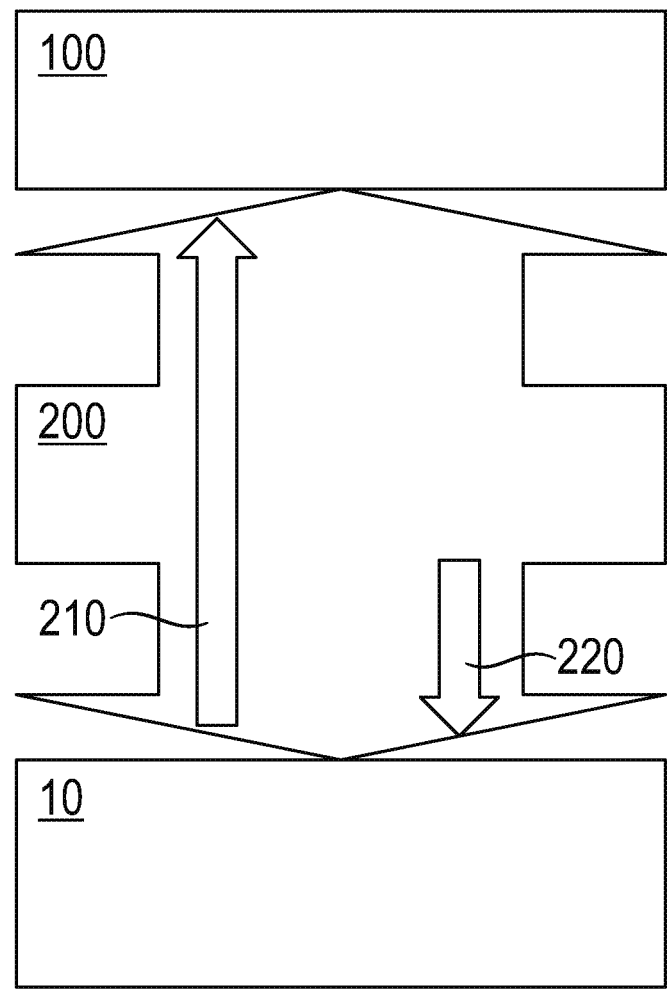
FIG. 3: shows a scheme of data streams between in a vehicle network in which a control device according to the invention is integrated to implement a driver assistance system according to the invention.

FIG. 3 shows the control device 10 according to the embodiment of FIGS. 1 and 2 or 5 to 7, which exchanges information with a domain control device via a vehicle network 200. The vehicle network 200 is represented by the entirety of the interacting means of communication within the motor vehicle equipped with the control device 10. As for the control device 10, the interface to the vehicle network 200 is formed by the network module 72 and the bus communication module 74 and the corresponding connections or sockets. The control device 10 receives vehicle data 220 via the vehicle network 200, which data is processed by the power processor 30, for example, when the objects are detected. The control device 10 provides at least object data 210, which was determined from the data of the sensor modules, via the vehicle network. In addition, specific diagnostic data or control commands can be transmitted to other systems connected to the vehicle network 200, such as the domain control device 100, by means of the safety processor 50.

Figure 4A:
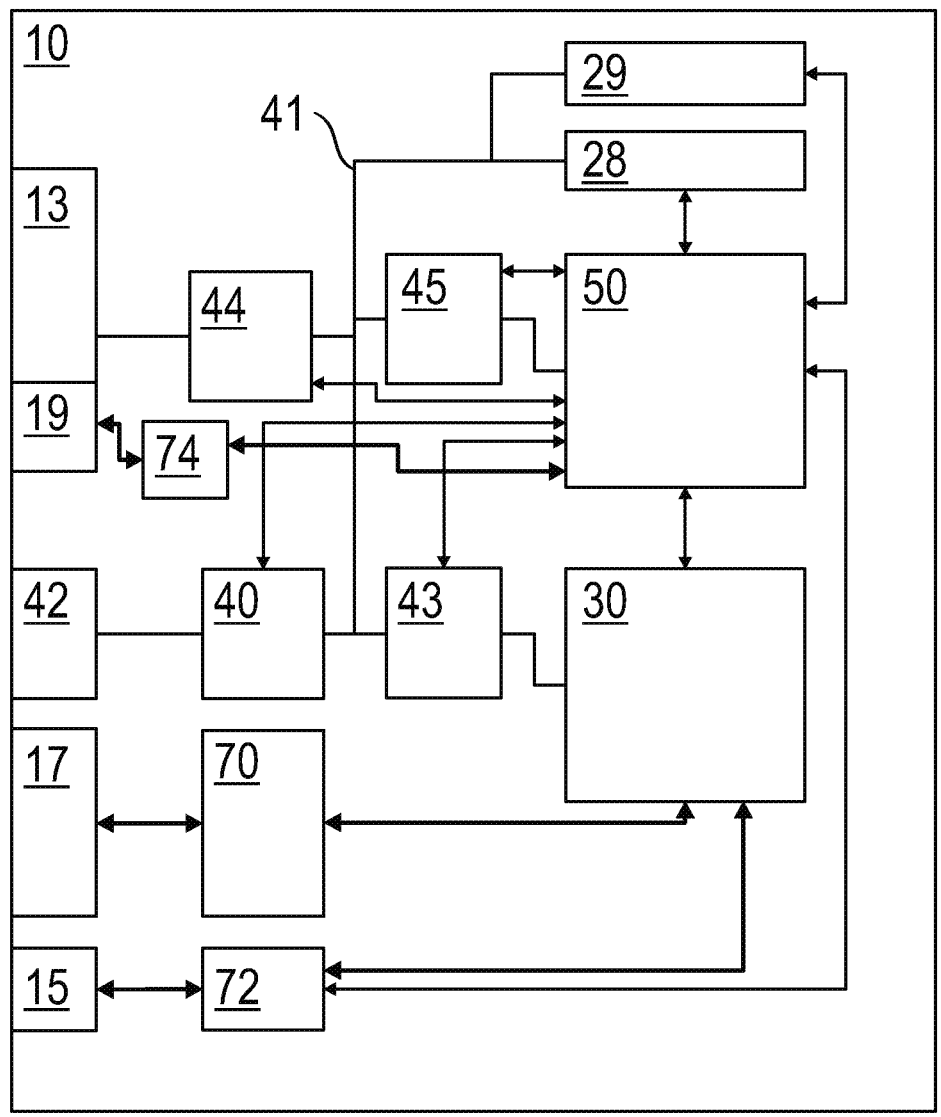
FIG. 4a: shows a schematic view of a second embodiment of a control device according to the invention.

FIG. 4a shows a second embodiment of a control device according to the invention, which is essentially identical to the control device 10 of FIGS. 1 and 2. Like components are therefore provided with like reference numbers. The control device 10 in FIG. 4a differs from the control device 10 in FIG. 2 only in that a pump actuator 29 is provided in addition. The pump actuator 29 comprises power electronics with a driver circuit for a brushless motor that drives a pump. The pump delivers a cleaning fluid to clean the sensor modules. The pump actuator 29 is connected to the power supply network 41. In this version, the safety processor 50 also monitors the pump actuator 29.

Figure 4B:
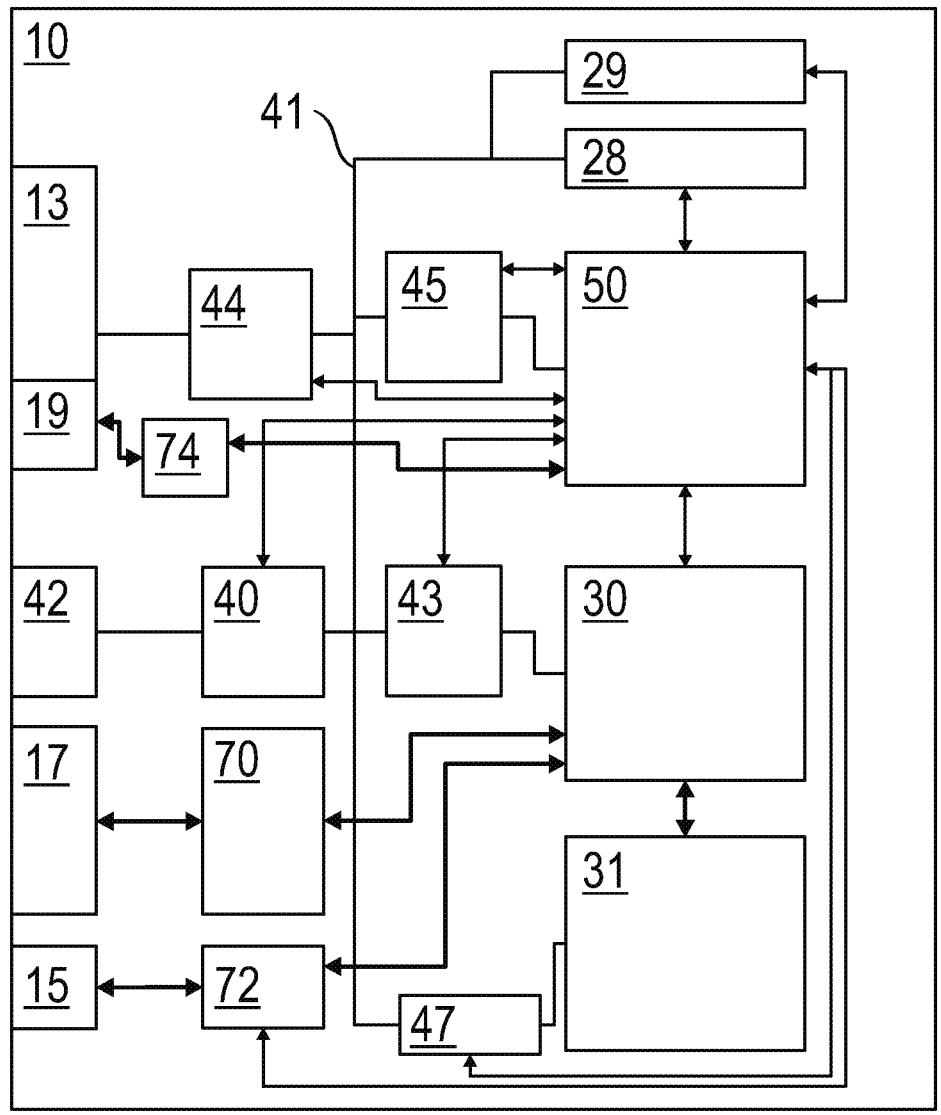
FIG. 4b: shows a schematic view of a third embodiment of a control device according to the invention.

FIG. 4b shows a third embodiment of the control device 10, which is substantially identical to the control device 10 according to the embodiment in FIG. 4a. Like components are therefore provided with like reference numbers. The control device 10 of FIG. 4b differs from the control device 10 of FIG. 4b in that it has a power coprocessor 31 in addition to the power processor 30. The power co-processor 31 is connected to the power processor 30 via a bus system such as PCI Express. However, the safety processor 50 only monitors the power processor 30 directly and is only indirectly connected to the power co-processor 31 via the power processor 30. The power co-processor 31 is powered by a further separate processor supply unit 47. The processor supply unit 47 is monitored by the safety processor 50. With the help of the power co-processor 31, a redundant computing system is provided for processing tasks that require high performance. Processing security is further increased by the redundancy. Alternatively or in addition, the power co-processor 31 is used to increase the overall computing power of the control device 10 at least temporarily.

The configuration with a power co-processor 31 can also be combined with the arrangement according to FIG. 1, according to which the pump actuator 29 would then be eliminated.

Figure 5:
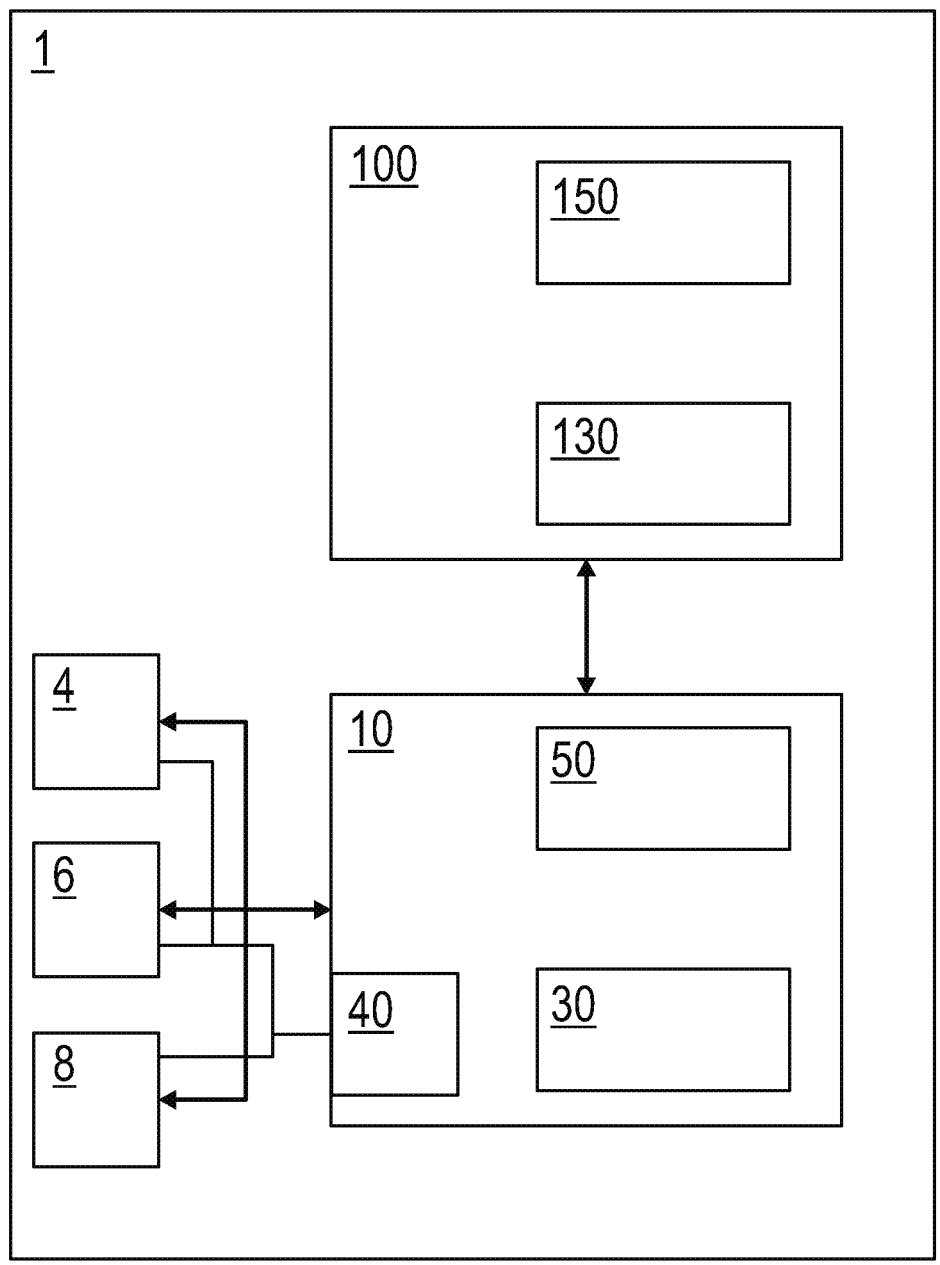
FIG. 5: shows a schematic view of a first embodiment of a driver assistance system according to the invention.

FIG. 5 shows an exemplary embodiment of a driver assistance system 1 with three sensor modules 4, 6, 8. The sensor modules 4, 6, 8 each have up to 2 sensors. The sensor modules 4, 6, 8 are connected to a sensor interface of a control device 10 via communication lines. The control device 10 can assume any of the embodiments described above. The sensor modules 4, 6, 8 are supplied with energy via the sensor voltage supply unit 40 of the control device 10. In any case, the control device 10 comprises a power processor 30, which is configured to detect objects from the data of the sensor modules, and a safety processor 50, which checks the power processor 30 and the sensor voltage supply unit 40 with regard to their function and/or reliability. The control device 10 is connected to a domain control device 100 on which the actual driver assistance function is implemented. That is, an action of the vehicle is triggered by the domain control device 100. For this purpose, the domain control device 100 has a power processor 130, which carries out calculations for the assistance function, and a safety processor 150, which at least partially verifies the calculations of the power processor 130.

Figure 6:
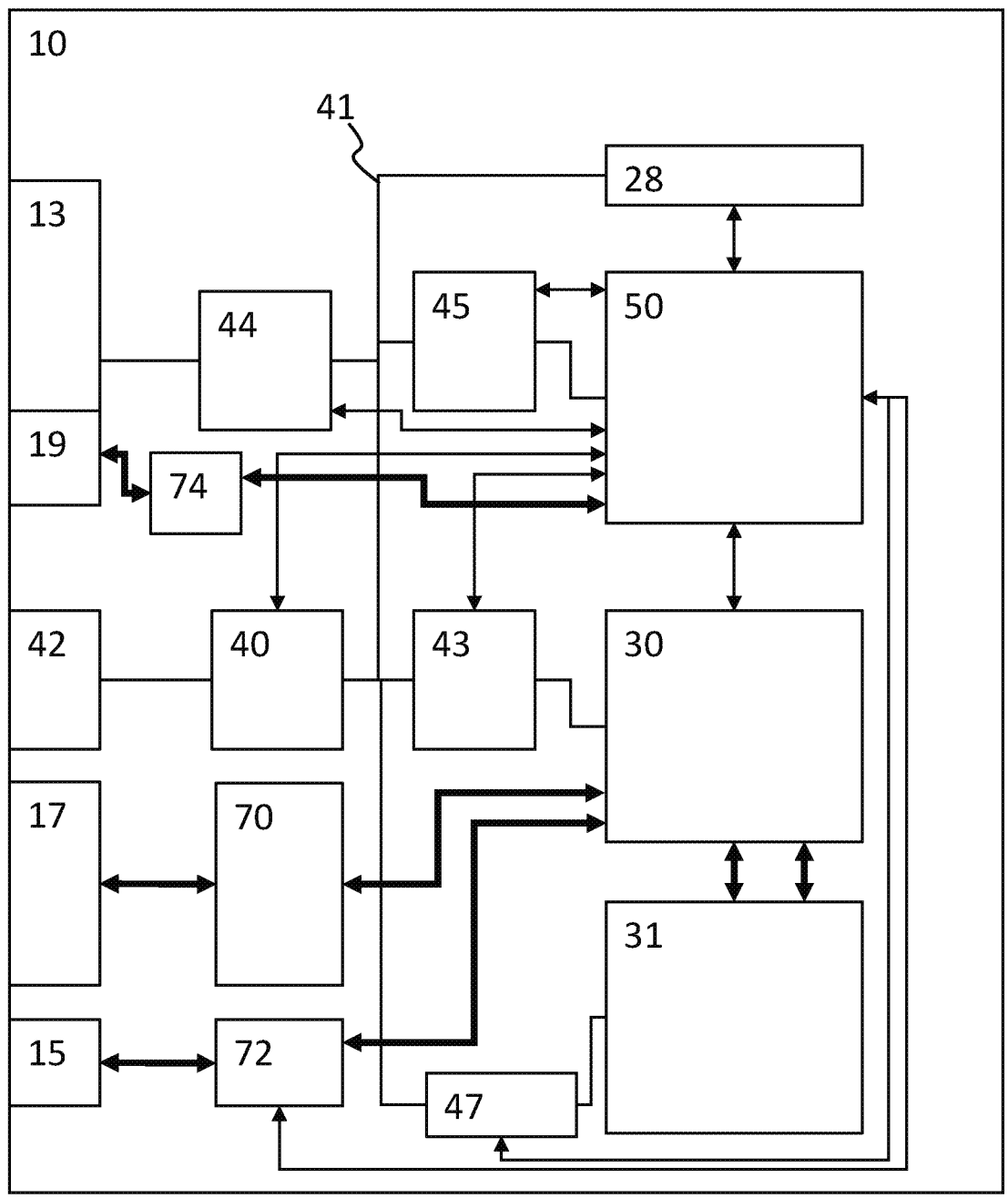
FIG. 6: shows a schematic view of another control device according to the invention according to the embodiment of FIG. 1.

As shown in FIG. 6, according to a further embodiment, a second power processor 31 is provided in addition to the power processor 30. The power co-processor 31 is connected to the power processor 30 via two data transmission channels. A data transmission channel is formed by bundling four transmission channels according to the Ethernet standard. For this purpose, an Ethernet switch is integrated in each of the two power processors. Another, independent data transmission channel is implemented using PCI Express technology. The safety processor 50 only monitors the power processor 30 directly and is only indirectly connected to the power co-processor 31 via the power processor 30. The power co-processor 31 is supplied with energy by another separate processor supply unit 47. The processor supply unit 47 is monitored by the safety processor 50. With the help of the power processor 31, a redundant computing system is provided for processing tasks that require high performance. Processing security is further increased by the redundancy. Alternatively or in addition, the power processor 31 is used to increase the overall computing power of the control device 10 at least temporarily.

The sensor communication module 70 forwards data received from the sensor modules to a power processor 30 that is connected to the sensor communication module 70. The power processor 30 is powered by a processor supply unit 43, which in turn is powered by the power grid 41. The power processor 30 is also connected to a system interface, which is implemented by a network module 72 and a network connection 15. The control device 10 can use the system interface to communicate data processed by the power processor 30 to the driver assistance system and receive data therefrom. The power processors 30, 31 prepare the data received from the sensor modules and process it with object recognition algorithms to detect objects in the area surrounding the vehicle that is equipped with the control device 10.

The control device 10 comprises a sensor voltage supply unit 40 which is fed from the energy supply network 41. The sensor modules can be supplied with energy from control device 10 via a plug-in connection 42. The sensor voltage supply unit comprises separate power electronics for a respective sensor of the sensor modules for independent provision of a stable supply. The sensor voltage supply unit 40 is configured such that at least 20%, particularly at least 30%, preferably 60% of the energy requirement of a sensor or at least 15% of the total energy requirement of the sensor modules is available as standby energy.

The sensor voltage supply unit 40 is also connected to a safety processor 50. The safety processor 50 is adapted to enable an implementation of the ASIL D standard. For this purpose, the safety processor 50 has at least one lockstep arithmetic core. The safety processor 50 is also adapted to monitor the sensor voltage supply unit 40. Since an error or a failure of data from the sensor modules can have serious consequences for automated driving, monitoring the sensor voltage supply unit 40 contributes to increasing the reliability of control device 10 and the driver assistance system. With the help of the safety processor 50, input or output voltage curves, corresponding current curves, a temperature and/or other electrical operating parameters of the sensor voltage supply unit 40 are recorded and evaluated to detect functional limitations at an early stage.

The safety processor 50 also monitors the processor supply units 43, 47 of the power processors 30, 31, a processor supply unit 45 of the safety processor 50, and the energy supply unit 44. The entire energy supply system of the control device 10 is thus monitored using the respective operating parameters, such that potential problems can be identified immediately. The safety processor 50 is also adapted and configured to check the processing steps that the power processors 30, 31 carry out when processing data from the control device 10, in particular when detecting objects and forwarding object data. The safety processor 50 also handles checking and/or control tasks for the control system 28 of the cooling system and for the network module 72, via which the power processor 30 communicates with the driver assistance system.

Finally, the safety processor 50 is connected via a bus communication module 74 and a bus connection 19 to a communication bus, such as a CAN bus, of the motor vehicle, via which bus data can be exchanged within the vehicle.

Figure 7:
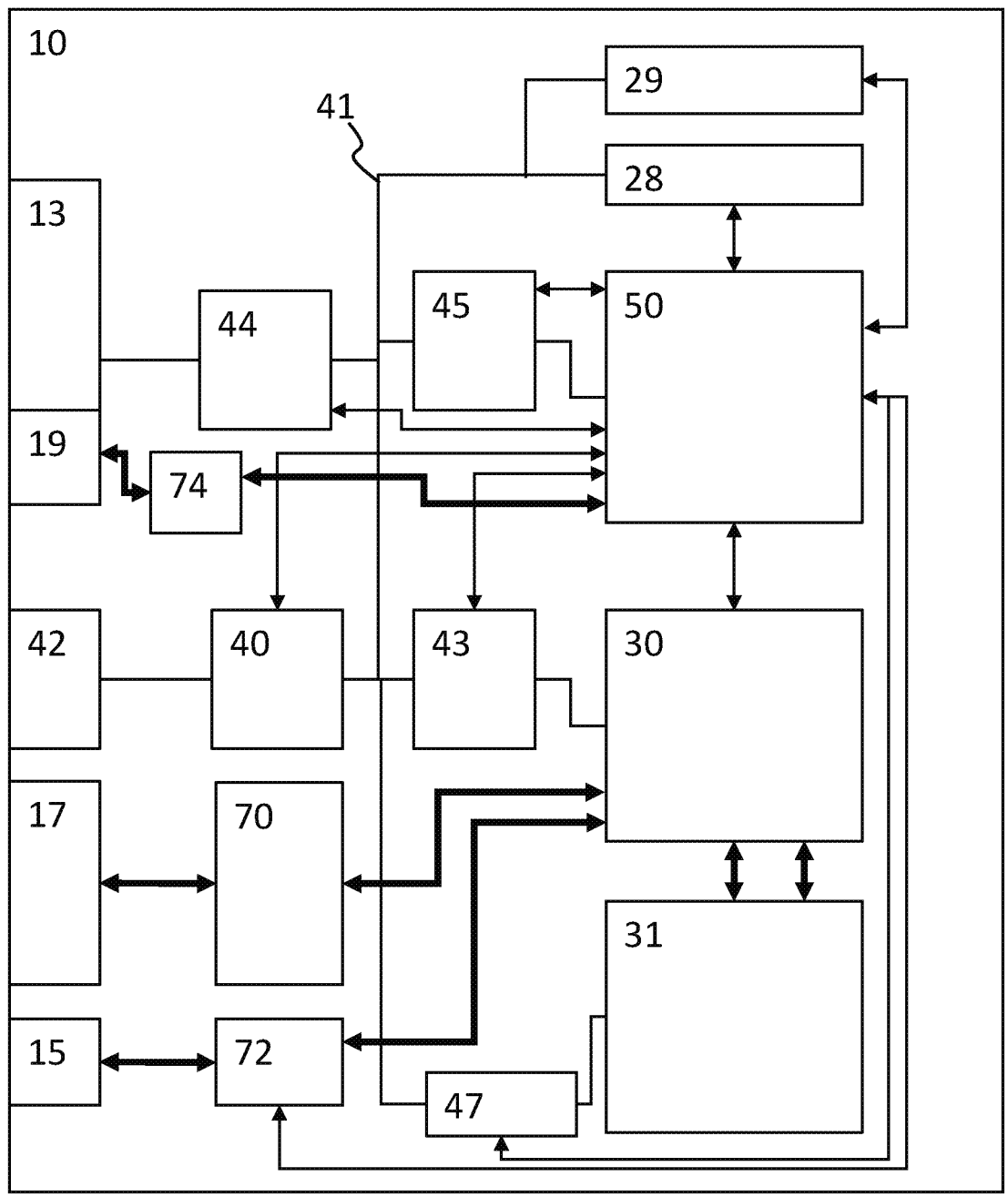
FIG. 7: shows a schematic view of another embodiment of a control device according to the invention.

FIG. 7 shows another embodiment of a control device according to the invention, which is substantially identical to the control device 10 of FIGS. 1 and 6. Like components are therefore provided with like reference numbers. The control device 10 in FIG. 7 differs from the control device 10 in FIG. 6 only in that a pump actuator 29 is provided in addition. The pump actuator 29 comprises power electronics with a driver circuit for a brushless motor that drives a pump. The pump delivers a cleaning fluid to clean the sensor modules. The pump actuator 29 is connected to the power supply network 41. In this version, the safety processor 50 also monitors the pump actuator 29.

Figure 8:
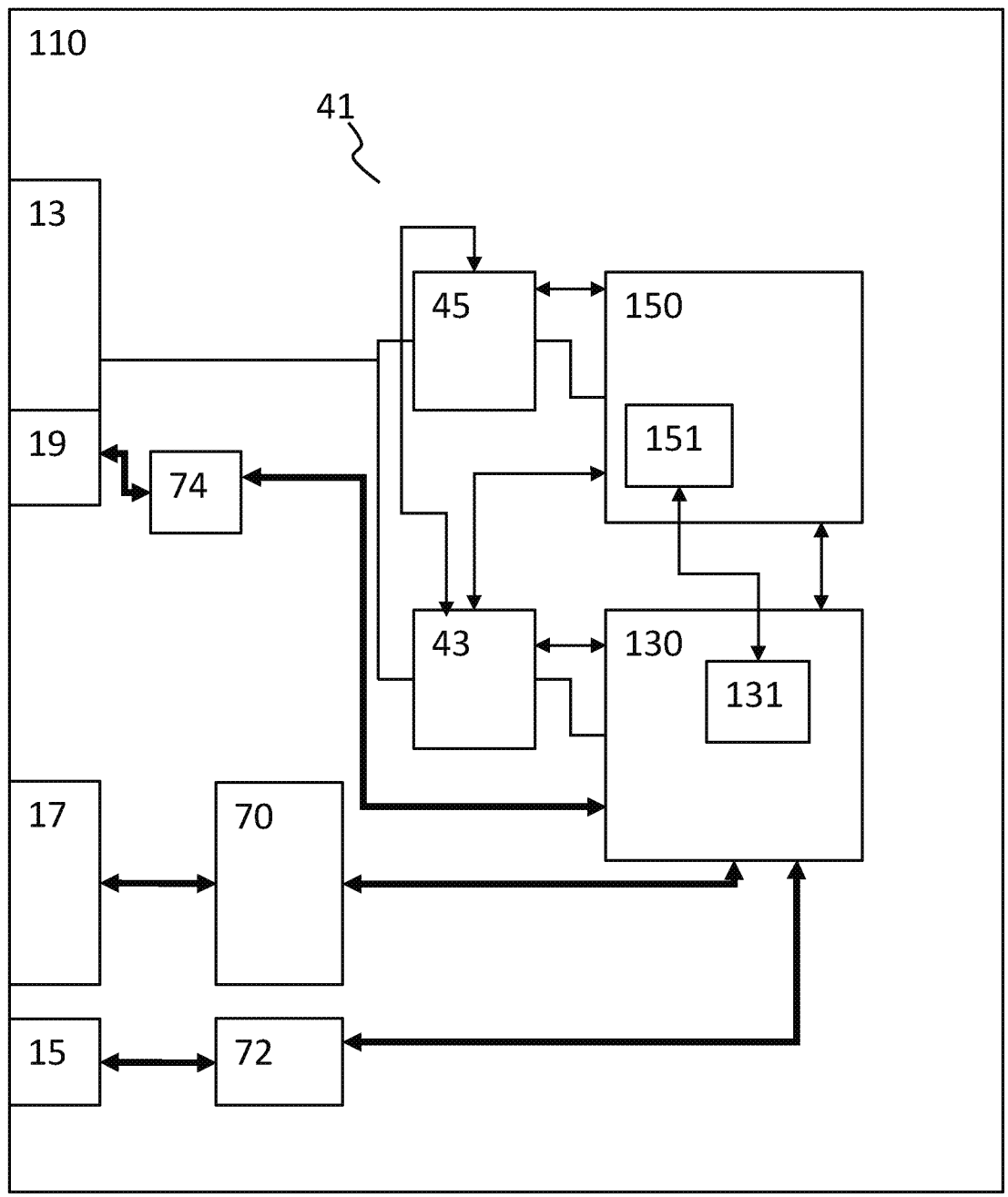
FIG. 8: shows a schematic view of another embodiment of a control device according to the invention.

FIG. 8 shows another embodiment of a control device 110 according to the invention, which substantially matches the control device 10 of FIGS. 2 and 4a. Like components with the same function are therefore provided with like reference numbers. The controller 110 differs from the previously mentioned control devices by a power processor 130 and a power processor 150, which have two different configuration modes. In a secure operating mode, one of the power processors 130, 150 is available as a standby unit if the other of the power processors 130, 150 should fail or calculate incorrectly. In this safe operating mode, a power processor 130, 150 can take over the tasks of the other power processor 130, 150 at any time. The control device 110 is configured in such a way that both power processors 130, 150 can receive the same data from the sensor module and can provide detected objects via identically configured interfaces. In particular, both power processors 130, 150 use at least some of the same interfaces, such as the bus connection 19.

The control device 110 can also be configured for a high-performance mode, in which the power processors 130, 150 split up the calculations for detecting the objects on the basis of the data from the at least one sensor module 4, 6, 8. For this purpose, a respective power processor 130, 150 selects part of the data from the at least one sensor module 4, 6, 8, which data is received via the sensor module connections 17, and works out object recognition algorithms on a respective part of the data. In this high-performance mode of operation, a higher amount of object detection calculations per time unit are possible than in the safe mode of operation.

The failure or error of a power processor 130, 150 is detected in the control device 110 by diagnostic units 131, 151 of the respective power processors 130, 150. The diagnostic units 131, 151 are each configured as hardware, for example as a reserved processor core, a separate processor or FPGA which processes predefined diagnostic tasks. The function of the diagnostic units 131, 151 is preset and not freely programmable. The diagnostic units 131, 151 check the functional readiness and correct functionality of an SRAM, a flash memory, one or more processor cores that can be used for applications, a processor clock, a temperature, and/or the energy supply units 43, 45 of the respective power processor 130, 150. The diagnostic units 131, 151 can each or jointly be configured in such a way that they implement a lockstep method.

In addition, diagnostic software is executed on the power processors 130, 150, which implements the further diagnostic functions for the power processors 131, 151 and the control device 110, e.g. checks whether specific software modules are called up and/or provide plausible results. In addition to the hardware diagnostic unit, the control device 110 is also provided with a software diagnostic unit, which can take on further diagnostic functions without negatively affecting the security of control device 110, since this runs on hardware tested by the hardware diagnostic unit.

REFERENCE SYMBOLS 1 driver assistance system
4, 6, 8 sensor modules
10 control device
12 housing
13 connection socket
14 printed circuit board
15 network socket
17 sensor module connectors
19 bus connection
20 cooling system
21 cooling fins
22 cooling system carrier
24 fan
28 control system
29 pump actuator
30, 130 power processor
31 power co-processor
40 sensor voltage supply unit
41 power supply network
42 plug-in connector
43 processor supply unit 44 energy supply unit
45 processor supply unit
50, 150 safety processor
70 sensor communication module
72 network module
74 bus communication module
100 domain controller
131, 151 diagnostic unit
200 vehicle network
210 object data
220 vehicle data

The invention claimed is:

1. A control device for a driver assistance system, the control device comprising:
a housing;
a sensor interface via which the control device can be connected to at least one sensor module for receiving data from the at least one sensor module;
a power processor which is adapted to detect objects and to provide object data based on the data from the at least one sensor module;
a processor power supply unit which provides operating energy for the power processor;
a system interface via which the control device can be connected to a higher-level control device of the driver assistance system for forwarding the object data provided by the power processor; and
a sensor voltage supply unit, separate from the processor power supply unit, which provides operating energy for the at least one sensor module,
wherein the sensor interface, the power processor, the processor power supply unit, the system interface, and the sensor voltage supply unit are integrated into the control device and arranged within the housing.

2. The control device according to claim 1, further comprising a safety processor which is connected to the sensor voltage supply unit and adapted to monitor the sensor voltage supply unit.

3. The control device according to any claim 1, further comprising a safety processor which is connected to the power processor and adapted to check at least one processing step of the power processor for errors and/or check a processing status of the power processor.

4. The control device according to claim 3, wherein the safety processor is further adapted to check a processing step in the object detection of the power processor for the data from the at least one sensor module and/or to access the object data via an interface to the power processor.

5. The control device according to claim 1, wherein the sensor interface is configured to be connected to at least three sensor modules simultaneously, and the control device is further adapted to chronologically synchronize data received via the sensor interface from the at least three sensor modules.

6. The control device according to claim 1, wherein the power processor is adapted and configured to determine an area passable by a motor vehicle based on the data from the at least one sensor module.

7. The control device according to claim 1, further comprising a control module for a cooling system of the control device.

8. The control device according to claim 1, further comprising power electronics for controlling a cleaning system for the at least one sensor module.

9. The control device according to claim 1, wherein the power processor is connected to the sensor interface for receiving the data from the at least one sensor module and the system interface and is configured to forward the object data to the system interface based on the data from the at least one sensor module.

10. The control device according to claim 1, wherein the housing is dustproof and/or waterproof.

11. The control device according to claim 1, wherein the at least one sensor module is a LIDAR sensor module.

12. A control device for a driver assistance system, the control device comprising:
a housing;
a sensor interface via which the control device can be connected to at least one sensor module for receiving data from the at least one sensor module;
a power processor which is adapted to detect objects and to provide object data based on the data from the at least one sensor module;
a system interface via which the control device can be connected to a higher-level control device of the driver assistance system for forwarding the object data provided by the power processor;
a safety processor, which is connected to the power processor and configured to check at least one processing step of the power processor for errors and/or to check a processing status of the power processor;
another power processor which is connected to the power processor;
a processor power supply unit which provides operating energy for the power processor and the another power processor; and
a sensor voltage supply unit, separate from the processor power supply unit, which provides operating energy for the at least one sensor module,
wherein the sensor interface, the power processor, the system interface, the safety processor, the another power processor, the processor power supply unit, and the sensor voltage supply unit are integrated into the control device and arranged within the housing.

13. The control device according to claim 12,
wherein the power processor and the other power processor are connected to one another via two independent data transmission channels, and
wherein the data transmission channels use different transmission protocols.

14. A control device for a driver assistance system, the control device comprising:
a housing;
a sensor interface via which the control device can be connected to at least one sensor module for receiving data from the at least one sensor module;
a power processor which is adapted to detect objects and to provide the detected objects based on the data from the at least one sensor module;
another power processor, which is connected to the power processor for transmitting control commands and/or data from the at least one sensor module;
a processor power supply unit which provides operating energy for the power processor and the another power processor; and
a sensor voltage supply unit, separate from the processor power supply unit, which provides operating energy for the at least one sensor module,
wherein the power processor and the another power processor are configured to be operable in a safe operating mode where the another power processor is adapted to detect the objects and to provide the detected objects based on the same data as the power processor from the at least one sensor module, wherein the power processor and the another power processor are further configured to be operable in a maximum performance operating mode where the power processor and the other power processor are each adapted to select part of the data from the at least one sensor module and to assign it the respective selected parts of the data to a respective one of the power processors based on the data from the at least one sensor module and to detect the objects and provide the detected objects based on the assigned data, and wherein the sensor interface, the power processor, the another power processor, the processor power supply unit, and the sensor voltage supply unit are integrated into the control device and arranged within the housing.

15. A driver assistance system for a motor vehicle, the driver assistance system comprising:

a domain controller with a first power processor and a first safety processor, wherein the first power processor is configured to process object data received via a vehicle network relating to an environment of the motor vehicle to provide a driver assistance function, and the first safety processor is configured and adapted to check at least one processing step of the first power processor for its correctness; and a control device that can be connected to the domain controller and has a second power processor, a second safety processor, and a sensor interface, wherein the control device can be connected to at least one sensor module via the sensor interface for receiving data from the at least one sensor module, wherein the second power processor is adapted to detect objects based on the data from the at least one sensor module and to provide the object data to the domain controller, and wherein the second safety processor checks the processing status of the second power processor and/or a processing step of the second power processor for errors.

* * * * *